3,021,472
LOW TEMPERATURE THERMIONIC
ENERGY CONVERTER
Karl G. Hernqvist, Princeton, N.J., assignor to Radio
Corporation of America, a corporation of Delaware
Filed Dec. 15, 1958, Ser. No. 780,520
20 Claims. (Cl. 322—2)

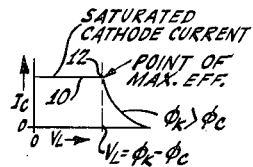
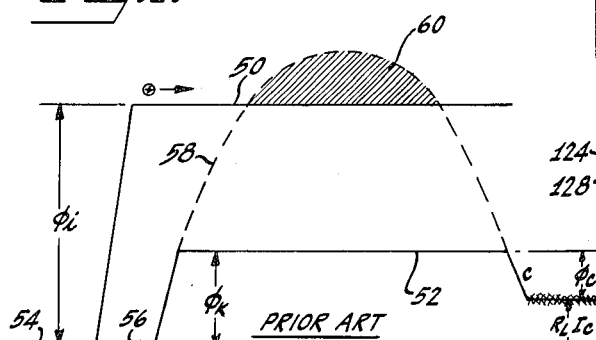
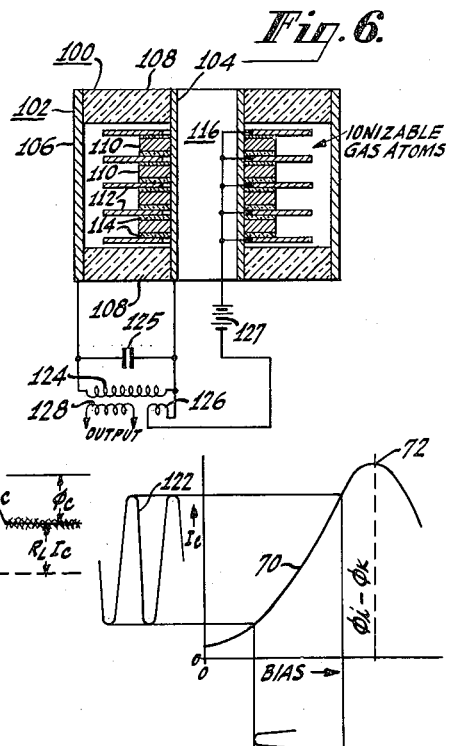
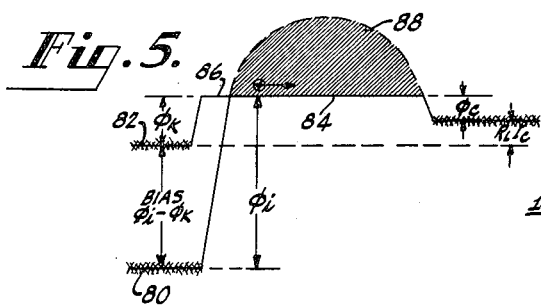
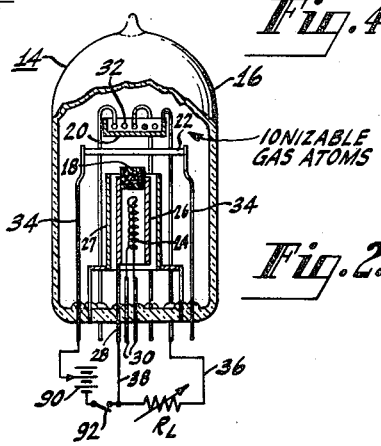
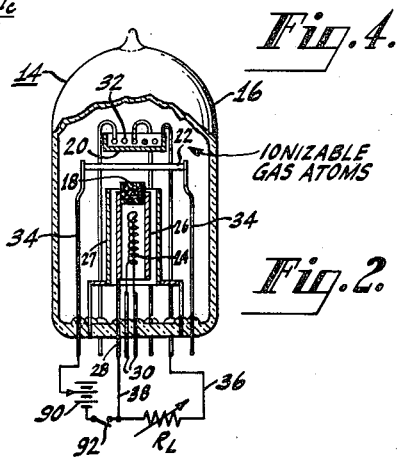
INVENTOR.
KARL G. HERNQVIST United States Patent Office 3,021,472
Patented Feb. 13, 1962

This invention relates to thermionic energy converters and particularly to thermionic energy converters which both operate at relatively low temperatures and employ space charge neutralization of the electron stream therein.

A thermionic energy converter is an electron discharge device or tube for directly converting heat into electrical energy. In its simplest form the thermionic energy converter comprises a thermionic cathode (electron emitter) and a collector electrode mounted in a vacuum-tight envelope. In operation of such a device, heat is supplied to the cathode to raise the potential energy of some electrons therein from the Fermi level of the cathode to the top of the potential barrier at the cathode surface. This increase of energy is equal to the work function of the cathode. Some of these electrons are emitted from the cathode surface and drift to the collector electrode provided the interelectrode space charge effects are not too great. Electrons which are collected by the collector lose, by virtue of their being collected, an amount of potential energy equal to the work function of the collector. This is representative of the difference between the collector surface potential barrier and the Fermi level of the collector. This energy appears as heat in the collector. The potential energy remaining in the electrons after collection is the contact difference of potential, that is, the energy equal to the work function of the cathode minus the work function of the collector. This residual potential energy is available as electrical energy to an output load connected between the cathode and collector.

For high energy-conversion efficiency in such a device it is necessary that the work function of the collector be substantially lower than the work function of the cathode. Then, advantage is taken of the fact that the contact difference of potential determines the maximum output voltage. Also, for high efficiency, the adverse effects of space charge in the interelectrode region of the device must be overcome.

Accordingly, it is an object of this invention to provide an improved thermionic energy converter having high energy-conversion efficiency compared to those of the prior art.

Another object of the invention is to provide an improved thermionic energy converter wherein high efficiency is attained by optimum utilization of space charge neutralization by contact ionization.

Another object of the invention is to provide an improved thermionic energy converter capable of both low temperature operation and space charge neutralization by contact ionization.

In the drawings:

FIG. 1 is a diagram of the theoretical volt-ampere characteristic of a thermionic energy converter diode;

FIG. 2 is a partial axial section view of a simplified embodiment of a thermionic energy converter according to my invention;

FIG. 3 is a typical potential energy diagram for a thermionic energy converter according to the prior art;

FIG. 4 is a graph illustrating the relationship of bias voltage versus collector current for the device of FIG. 2;

FIG. 5 is the potential energy diagram for the device of FIG. 2 operated in accordance with my invention;

FIG. 6 is an axial section view of another embodiment of a thermionic energy converter according to my invention; and FIG. 7 is a partial view in longitudinal cross section of a modification of the device of FIG. 6.

In FIG. 1, which is a graph illustrating a theoretical volt-ampere characteristic curve of a thermionic energy converter having given cathode and collector materials in which the cathode work function $\phi_k$ exceeds the collector work function $\phi_c$, the collector current, $I_c$, is plotted as the ordinate and the output voltage, $V_L$, is the abscissa. $V_L$ is equal to $I_c R_L$, where $R_L$ is the load impedance. The curve 10 illustrates the theoretical variation of $I_c$ as the load impedance $R_L$ is varied from zero to a maximum, with constant cathode temperature. The left hand end of the curve represents $R_L=0$.

As $R_L$ is increased from zero, $I_c$ remains a constant at a value $I_0$ to the point $R_0$ where $V_L = V_0 = R_0 I_0 = \phi_k - \phi_c$. This indicates that for the values of $R_L$ below $R_0$, $I_c$ is determined by the saturated cathode current $I_0$. In other words the maximum current obtainable in the device has a limitation dependent upon the particular cathode material and the temperature at which it is operated. As $R_L$ is increased beyond the value $R_0$, which gives a condition of $V_L = \phi_k - \phi_c$, $I_c$ decreases exponentially. Thus, it is apparent that the knee 12 of the curve 10 is the operation point of maximum efficiency, i.e., where maximum energy or power is obtained from the device. This is the point at which the present invention is designed to operate. Thus, for maximum efficiency the load resistance $R_L$ must be adjusted to $R_0$. Curve 10 thus illustrates that electrically the thermionic energy converter is a constant current generator up to the point of maximum efficiency, where $V_L = \phi_k - \phi_c$.

Briefly, according to my invention an improved thermionic energy converter comprises a three-electrode gas tube including a collector electrode, a thermionic cathode having a work function sufficiently low to provide relatively low temperature electron emission, and an ionizing or ion producing electrode having a higher work function than that of the cathode. Ionizable gas atoms having a lower ionization potential than the work function of the ionizing electrode are included in the envelope of the tube for producing positive ions by contact ionization. The cathode and ionizing electrodes are electrically insulated from each other, preferably by a material such as beryllium oxide or aluminum oxide which permits relatively good thermal conductivity between these electrodes, to permit said electrodes to be biased at different potentials.

FIG. 2 illustrates a three electrode thermionic energy converter 14 built and operated as an experimental embodiment to prove the theory of my invention. The converter 14 comprises an envelope 16 of insulative material in which a cathode element 18, a disk collector electrode 20, and a ribbon ionizing electrode 22 are mounted. A quantity of ionizable gas atoms is included in the envelope. The cathode and collector electrodes 18 and 20 are essentially of the planar type and are disposed in spaced relation with the ribbon ionizing electrode 28 disposed therebetween. The three electrodes 18, 20, and 22 are mounted on conductive supports sealed through the envelope 16. As such the cathode 18 and ionizing electrode 22 are electrically insulated from each other. The merit of such insulated relationship will be more fully described hereinafter.

The ionizing electrode 22 has a work function greater than either the ionization potential of the enclosed gas atoms or the work function of the cathode 18. Preferably, although not necessarily, the collector 20 has a work function still lower than that of the cathode 18.

A converter tube according to the structure of the tube 14 built and actually operated according to the invention included a cathode of tungsten impregnated with a barium compound, a tungsten ionizing electrode, and collector of nickel coated with barium and strontium oxides. An ionizable gas filling of cesium vapor was included in the envelope.

In practical embodiments of my invention the cathode is adapted to be heated by an external source of heat whose energy it is desired to convert to electrical energy. Such an embodiment is described with reference to FIG. 6. However, for the purpose of experimentally proving the theory of my invention with the converter 14 of FIG. 2, the cathode 18 is adapted to be electrically heated by a heater coil 24 disposed adjacent to the cathode 18. The cathode 18 is mounted at one end of a hollow cylindrical housing 26 in which the heater coil 24 is disposed. To prevent excessive heat radiation from adjacent the cathode 18, a hollow cylindrical heat shield 27 is disposed around the housing 26. Suitable lead-ins 28 and 30 are sealed through the envelope 16 and connect respectively to the cathode 18 and heater coil 24.

To further simulate actual operating conditions, a second heater coil 32 is disposed adjacent the collector 20. A minimum heating of the collector 20 is necessary in order to render its surface of barium and strontium oxides sufficiently conductive so as to serve as an electrode. In the commercial embodiment of FIG. 6 such is not necessary since heat from the heat source is directed outwardly toward the collector rather than radiating in all directions as is so with the heat produced by the heater coil 24. Also for the purpose of simulating actual operating conditions in the converter 14, the ionizing electrode 22 is adapted to be electrically heated through its supporting lead-ins 34.

In operation of the converter 14, heat from the heater coil 24 serves to raise the temperature of the cathode 18 to a point where it will thermionically emit electrons. The condition which must be realized is that as previously described wherein electrons are provided with an increase of kinetic energy sufficient to raise them from the cathode Fermi level to the cathode barrier level, whereby some of the electrons will be emitted from the surface of the cathode 18. Simultaneously, atoms of the ionizable gas drift into contact with the heated ionizing electrode 22 and are there ionized by contact (or resonance) ionization. The positive ions so produced serve to neutralize the space charge of the cathode emitted electrons. Electrons so neutralized drift at thermal velocities away from the cathode 18 and into contact with the collector 20. In being emitted from the cathode 18, the electrons are given potential energy in excess of that amount which is given up as heat in being collected by the collector 20. The potential energy remaining in the collected electrons is converted to electrical energy and is available as output energy. This output energy is utilized by an external load having one lead 36 connected to the collector 20 and another lead 38 connected to the cathode 18. In FIG. 2, $R_L$ represents the load impedance in which the converted output electrical energy is dissipated.

The selection of suitable electrode compositions for the converter 14 involves consideration of the work functions of variously available materials. Since maximum output voltage $V_L$, and hence maximum power output, is determined by the difference of the cathode and collector work functions, $\phi_k - \phi_c$, a first consideration is that the difference of work functions of these two electrodes be as great as possible. Accordingly, the collector 20 preferably includes a material or composition having a work function as low as possible. However, conflicting considerations are involved in selection of a material or composition for the cathode 18. The first consideration as stated above would dictate that the composition of the cathode 18 should have a work function as high as possible in order to obtain a large value of $\phi_k - \phi_c$ to produce a large maximum load voltage $V_L$. However, a second consideration dictates that the cathode work function should also be relatively low so that a relatively high electron emission is obtained in response to a relatively low cathode temperature. This consideration becomes a primary one when the converter 14 is to be used with low temperature heat sources. Thus, a compromise must be made between a cathode composition having a high work function to give a high output voltage $V_L$ and a low work function to give good electron emission at a relatively low cathode temperature.

Selection of a suitable material or composition for the ionizing electrode involves no such conflicting considerations. The only considerations here are that the work function of the ionizing electrode 22 be greater than the ionization potential of the ionizable gas filling so that contact ionization can take place, and that it be able to withstand the operating temperatures encountered. Accordingly, a material having an extremely high work function may be selected for the ionizing electrode 22 so that it easily exceeds the ionization potential of the ionizable gas atoms. Conversely, the only consideration of the ionizable gas atoms is that their ionization potential be less than the work function of at least portions of the ionizing electrode 22.

Examples of suitable collector compositions chosen only because of their relatively low work function include the following: a mixture of barium and strontium oxides on a nickel base resulting in a work function of approximately 1.0 electron volt; cesiated silver oxide having a work function of approximately 0.75 electron volt; and cesiated tungsten oxide having a work function of approximately 0.71 electron volt. Examples of suitable cathode compositions, which are believed to provide an optimum compromise between the considerations of a high value of $\phi_k - \phi_c$ and low temperature electron emission include the following: sintered tungsten particles impregnated with known suitable barium compounds such as might give a work function of approximately 1.7 electron volts and a thermionic emission temperature of approximately 900–1200° C.; thoriated tungsten having an effective work function of approximately 2.55 electron volts and a thermionic emission temperature of approximately 1800–2000° C.; and cesiated tungsten having a work function of approximately 1.7 electron volts and a thermionic emission temperature of approximately 1400–1600° C. Any cathode-collector combination of the above-listed materials may be used and will provide operation in accordance with the teaching herein disclosed. Alternately, any other materials may be used for the cathode and collector in accordance with the generalized teaching of the selection of suitable materials as hereinbefore discussed. Of the materials listed, a collector of cesiated tungsten oxide and a cathode of barium compound-impregnated tungsten is preferred.

Preferred ionizing electrode materials include iron, tungsten, molybdenum, tantalum, platinum, nickel and rhenium; all of which have work functions high enough to provide contact ionization of the preferred cesium vapor.

Suitable ionizable gases include the vapors of francium, cesium, rubidium, potassium, and sodium. However, it should be noted that not all of these gases will be contact ionized by all of the listed ionizing electrode materials. Thus, the generalized requirement as above described must be adhered to.

As previously stated, the simplest form of prior art thermionic energy converter comprises a two-electrode device. In such a device, if space charge neutralization by contact ionization is utilized to provide increased efficiency, the cathode electrode must have a work function suitably high to contact ionize the ionizable gas atoms. Cesium represents probably the most practical selection of ionizable gas atoms due to its availability and its relatively low ionization potential of approximately 3.89 electron volts. If, then, cesium is used as the ionizable gas in a two-electrode thermionic energy converter, the single material cathode-ionizing electrode must consist of a relatively high work function material such as tungsten. However, the use of high work function materials such as tungsten as a cathode does not permit the desired low temperature operation. Tungsten provides adequate thermionic emission only at temperatures in excess of 2500° C. Accordingly, devices have been proposed which include a combination cathode-ionizing electrode which comprises relatively low work function cathode portions for relatively low temperature electron emission and relatively high work function ionizing portions for providing contact ionization of cesium or other suitable gas atoms. In such devices the cathode and ionizing portions were in contact with each other. When such a prior art combination electrode is provided, optimum space charge neutralization by contact ionization is not obtained because of the electrically integral nature of the cathode and ionizing portions of the electrode.

FIG. 3 is a potential energy diagram of such a prior art combination-electrode thermionic energy converter wherein the cathode and ionizing portions are not electrically insulated from each other, with a load impedance $R_L = R_0$ so that $V_L = R_L I_c = \phi_k - \phi_c$. In the diagram, an increase of negative potential level is indicated in an upward direction. Thus, the barrier level 50 of the ionizing portions is at a more negative potential than the barrier level 52 of the cathode portions when the Fermi levels 54 and 56 of the ionizing and cathode portions, respectively, are established at the same level by being in contact or otherwise electrically connected together. Such a condition, of course, exists in devices according to the prior art using combination cathode-ionizing electrodes.

FIG. 3 shows that electrons emitted at the barrier level 52 of the cathode portions, in attempting to drift to the collector, will develop a potential gradient 58 as indicated by the dotted line as the result of space charge. Since the work function $\phi_i$ of the ionizing portions is much larger than the work function $\phi_k$ of the cathode portions, and since the Fermi levels of these portions are established at the same level, ions will be produced at the barrier level 50 of the ionizing portions with a much greater negative potential than the electrons emitted by the cathode portions. Thus, the ions available for space charge neutralization are capable only of suppressing that portion of the space charge which negatively exceeds the barrier level 50 of the ionizing portions. This portion is indicated by the shaded area 60. Hence, rather inefficient space charge neutralization is thus obtained in this type of prior art combination-electrode thermionic converter. My invention provides a solution to this condition, a condition whose existence, though actual, has not been appreciated by the prior art.

According to my invention, the cathode 16 is electrically insulated from the ionizing electrode 22, so that the Fermi levels of these two electrodes are not necessarily established at the same level, and thus the converter 14 may be operated to obtain optimum space charge neutralization by contact ionization. This optimum condition of neutralization is achieved in accordance with my invention by an electrical bias between the cathode 18 and the ionizing electrode 22, which is made possible by their mutual electrical insulation.

FIG. 4 is a graph whose curve illustrates the relationship between collector current, $I_c$, plotted as the ordinate and cathode-ionizing electrode bias voltage, $V_B$, plotted as the abscissa. The curve 70 thereof illustrates that with no bias voltage applied between the cathode and ionizing electrodes, a minimum predetermined amount of collector current, $I_c$, will flow. However, as an increasing positive bias is applied to the ionizing electrode 22, $I_c$ increases to a maximum at the point where the bias, $V_B$, equals $\phi_i - \phi_k$, or the difference in the work functions of the ionizing and cathode electrodes. Additional increase of $V_B$ results in a decrease of $I_c$. Thus, when a biased condition is established between the cathode and ionizing electrode 18 and 22 respectively in the amount of the difference in their work functions, maximum output current, $I_c$, and thus maximum output energy is obtained.

FIG. 5 is a potential energy diagram representing the operation of the converter 14 according to my invention, wherein the ionizing electrode 22 is biased positively relative to the cathode 18 in an amount equal to $\phi_i - \phi_k$. As such, optimum operation at the peak 72 of the curve 70 of FIG. 4 is assured. In comparing the potential energy diagram of FIG. 5 with that of FIG. 3 it will be appreciated that the Fermi level 80 of the ionizing electrode has been shifted in a positive direction (downward on the diagram) relative to the Fermi level 82 of the cathode by an amount equal to the difference in their work functions, $\phi_i - \phi_k$. Thus, the barrier levels 84 and 86 of the ionizing electrode 22 and the cathode 18, respectively, are established at the same potential energy level, and ions and electrons are thus produced from their respective electrodes at the same potential energy level. Accordingly, the space charge 88—as indicated by the shaded area—which would exist in the absence of neutralizing ions, can be completely depressed to the barrier level potential of the cathode by the ions. Since maximum collector current, $I_c$, can flow only when the interelectrode space charge is effectively neutralized, the creation of a bias equal to $\phi_i - \phi_k$ results in maximum collector current as indicated by the curve 70 of FIG. 4.

Actual operation according to my invention has indicated that a bias equal to $\phi_i - \phi_k$ in the proper polarity can be established between the cathode 18 and the ionizing electrode 22 in one of two ways. A suitable bias may be established by applying voltage from an external source equal to $\phi_i - \phi_k$ between the cathode and ionizing electrodes 18 and 22 as by a battery 90 (FIG. 2). In such event a switch 92 disposed in the bias circuit in series with the battery 90 would be maintained in a closed position. On the other hand, I have found that a suitable bias substantially equal to $\phi_i - \phi_k$ and in the desired polarity can be established between the cathode 18 and ionizing electrode 22 simply by opening the switch 92 and operating the converter 14. As such, with the cathode 18 and ionizing electrode 22 electrically insulated and floating relative to each other, operation of the converter 14 results in the ionizing electrode 22 maintaining a positive charge relative to the cathode 18 substantially equal to $\phi_i - \phi_k$. The reason for this self-biasing phenomenon has not been definitely ascertained. However, one theory would suggest that second order effects involving possibly both electron emission and ion production by the ionizing electrode 22 occur which result in a net overall positive charging of the ionizing electrode. Continued operation of the converter 14 has proved that such positive charging of the ionizing electrode will maintain itself at a value substantially equal to $\phi_i - \phi_k$.

FIG. 6 illustrates a preferred practical embodiment of my invention. A thermionic energy converter 100 comprises an annular vacuum-tight envelope 102 having an inner cylindrical wall 104 and an outer cylindrical wall 106 closed at their ends by annular insulator walls 108. A quantity of ionizable gas atoms are included within the envelope 102. Mounted within the envelope and concentrically surrounding the inner wall 104 is a stacked array of cathode elements 110 and ionizing electrode elements 112, with the inner wall 104 in contact with the cathode elements 110 and spaced from the ionizing electrode elements 112 as shown in the drawing. As shown, the ionizing electrode elements 112 extend in front of the cathode elements 110, that is, into the space between the cathode elements 110 and the wall 106. The composition of the ionizing and cathode electrodes and the gas atoms are such that the work function of the ionizing electrode elements exceeds the work function of the cathode elements and the ionization potential of the gas atoms. The cathode and ionizing electrode elements 110 and 112 are electrically insulated from each other by electrical insulator washers 114. Although not essential to a successful operation according to my invention, the electrical insulator washers 114 are preferably of a material such as beryllium oxide which permits relatively good thermal conductivity between the cathode elements 110 and the ionizing electrode elements 112. The outer wall 106 of the thermionic converter 100 serves as a collector electrode.

The hollow opening 116 to the converter 110 is such as to accommodate an external source of heat for heating the inner wall 104 and elements 110 and 112 in the operation of the converter 100. It will be appreciated that such operation is not limited to use of any particular kind of heat source but may function in response to any heat source capable of raising the cathode electron emitters 110 to a thermionic emitting temperature. Suitable heat sources include ordinary flames, nuclear reactors, solar energy, and radio-active energy.

Although FIG. 6 illustrates a preferred embodiment of my invention, it will be appreciated that the shape, relative disposition, and relative and absolute size of the cathode and ionizing electrodes 110 and 112 are not limited to that of the structure of FIG. 6. For example, should a device of my invention be operated with a self-biasing rather than an applied bias, the cathode and ionizing electrode elements 110 and 112 might be provided as a coherent mass of suitable particles adequately electrically insulated from each other such as by a surface coating on the particles. On the other hand, should it be desired to construct a built-up structure of discretely shaped and sized cathode and ionizing electrode elements 110 and 112 according to the structure of FIG. 6 or to some other suitable structure, the insulator disks 114 need not necessarily be made of a thermally conductive material. Thermally conductive insulating disks 114 are preferred only for the purpose of providing a practical construction wherein a single source of heat will serve to better uniformly heat both the cathode elements 110 and the ionizing electrode elements 112. Such a feature is in no way a necessary one of my invention.

One undesirable characteristic of the thermionic energy converter wherein the difference between the work functions of the cathode and collector electrodes determines the output voltage, is that an extremely low voltage device results. An obvious solution to this problem is to combine a plurality of converters and electrically couple them in series so as to produce an additive, higher output voltage. On the other hand, since in addition to being a low voltage device the thermionic energy converter is also a relatively high current device, sufficient energy may be converted by a single such device for certain applications so that ganging of a plurality of such devices may not be necessary from a power standpoint. For such applications, a method of operation is herein proposed for obtaining an A.C. output from the converters 14 and 100 or a modified version thereof such that the output may be coupled through a transformer to obtain a lower current, higher voltage output.

FIG. 4 illustrates the manner in which an A.C. output current can be obtained by applying the cathode-ionizing electrode bias as an A.C. signal. An A.C. voltage represented by a wave form 120 applied as the bias will produce an A.C. output corresponding to the wave form 122. Since the energy required to provide the bias is of much lower magnitude than the energy output of the converter, any suitable oscillator and feedback circuit known in the art may be used with the converter to obtain from the output thereof an A.C. bias signal corresponding to the wave form 120. The response of the output current, $I_c$, to a change in bias 120 has proved to be sufficiently fast to permit A.C. operation in the kilocycle range and upward.

FIG. 6 illustrates one form of suitable oscillator and feedback circuit for obtaining self-sustained A.C. output. A tuned parallel circuit comprising an inductance 124 and a capacitance 125 is connected between the collector 106 and the cathode 110. A portion of the oscillatory energy from the tuned circuit is coupled therefrom by a first secondary inductance 126 and applied between the cathode 110 and ionizing electrode 112. A suitable D.C. bias level is established by a battery 127. Useable output from the converter 100 is obtained from a second secondary inductance 128 coupled to the tuned circuit. It will be appreciated that the oscillator and feedback circuit shown with the converter 100 of FIG. 6 can be equally applied to other embodiments according to my invention such as the converter 14 of FIG. 2.

FIG. 7 illustrates a modification of the converter 100 of FIG. 6 wherein a metallic seal member 130 is substituted for each of the annular insulators 108 which close the ends of the converter 100. The seal members 130 comprise a relatively high-resistance, brazable material such as a suitable metal. The energy converter is essentially an extremely low voltage device and will accordingly utilize a load resistance of approximately 0.01 ohm. Therefore, if the seal members 130 are made to have a resistance between their inner and outer sealing points of at least in the order of, e.g., one ohm, they will provide adequate electrical separation between the two envelope walls 104 and 106. Such seal members 130 provide the advantage of an easily brazed construction thus avoiding costly glass-to-metal or ceramic-to-metal seals. Moreover, the metallic seal provided is not adversely attacked by the gas filling within the envelope such as is characteristic in the case of the preferred cesium filling.

Each seal member 130 is annular and is sealed such as by brazing to adjacent ends of the inner and outer walls 104 and 106. Each seal member 130 preferably comprises an annular bellows-like structure. Thus, there is provided both excellent differential expansion characteristics and a sufficiently long electrical path between the inner wall 104 and the outer wall 106 to give sufficient resistance for adequate electrical separation. Alternatively to the bellows structure, metallic seal can be of a less complex structure. Thus, in cases where the load impedance of the converter is sufficiently small and a high enough resistance metal used, the seal member may take its simplest form of merely an annular disk sealed to the ends of the inner and outer walls 104 and 106.

Known suitable metals for the seal members 130 include alloys such as Nichrome and Kanthal.

What is claimed is:

1. A discharge device comprising an envelope containing a thermionic cathode having a relatively low work function, means for heating said cathode to electron-emitting temperature, and means for producing positive ions in said envelope independently of ionization by electron impact, for neutralizing the space charge of the electrons emitted by said cathode; said ion producing means comprising an ion producing electrode insulated from said cathode and having a work function substantially higher than said cathode work function, and means for heating said electrode to ion producing temperature.

2. A discharge device according to claim 1, including a voltage source connected between said cathode and said ion producing electrode for biasing said electrode positive relative to said cathode by an amount substantially equal to the difference between the work functions of said cathode and said electrode.

3. A discharge device according to claim 1, wherein said ion producing electrode comprises a plurality of spaced portions positioned at least partly in front of said cathode.

4. A discharge device according to claim 1, wherein each of said cathode and said ion producing electrode comprises an array of spaced elements, with the elements of one array alternating in position with the elements of the other array.

5. A low temperature thermionic energy converter comprising an envelope containing a thermionic cathode having a relatively low work function, means for heating said cathode to electron emitting temperature, a collector spaced from said cathode, and means for producing positive ions in the space between said cathode and said collector independently of ionization by electron impact for neutralizing the space charge of the electrons emitted by said cathode; said ion producing means comprising an ion producing electrode electrically insulated from said cathode and said collector and having a work function substantially higher than said cathode, and means for heating said electrode to ion producing temperature.

6. A low temperature thermionic energy converter according to claim 5 including an output impedance including no voltage source connected directly between said cathode and said collector.

7. A low temperature thermionic energy converter according to claim 5, wherein the work function of said collector is substantially lower than the work function of said cathode.

8. A low temperature thermionic energy converter according to claim 5, including a voltage source connected between said cathode and said ion producing electrode for biasing said electrode positive relative to said cathode by an amount substantially equal to the difference between the work function of said electrode and the work function of said cathode.

9. A low temperature thermionic energy converter according to claim 5 including oscillatory means connected between said cathode and said collector, and means coupling at least a portion of the energy from said oscillatory means and applying said portion to and between said cathode and said electrode.

10. A low temperature thermionic energy converter comprising an envelope containing at least one ionizing electrode element having a given work function, at least one thermionic cathode element having a work function substantially less than said given work function, means for heating said elements, a collector, and a quantity of ionizable gas atoms having an ionization potential between the work functions of said ionizing electrode element and said cathode element, said ionizing electrode element being electrically insulated from said cathode element.

11. A thermionic energy converter according to claim 10 wherein said cathode and ionizing electrode elements are disposed in close-spaced relation.

12. A low temperature thermionic energy converter according to claim 10 having a plurality of said cathode and ionizing electrode elements disposed alternately in a stacked array and including electrical insulator elements each interleaved between adjacent ones of said ionizing electrode and cathode elements.

13. A thermionic energy converter according to claim 12 and wherein said electrical insulator elements are made of a thermally conductive insulating material, and said means for heating said elements comprises means mounting said cathode elements in contact with a thermally conductive portion of said envelope, whereby said elements can be heated from a common external heat source.

14. A thermionic energy converter according to claim 10 and wherein said ionizing element is tungsten, said cathode element is tungsten impregnated with a barium compound, said collector is a combination of barium and strontium oxides on nickel, and said gas atoms are cesium.

15. A thermionic energy converter according to claim 10 wherein said elements comprise a coherent mass of cathode and ionizing particles coated with insulating material.

16. A low temperature thermionic energy converter according to claim 5 adapted for operation with a relatively low load impedance, wherein said cathode and collector are electrically separated by a metallic seal member sealed between said cathode and collector and forming a part of said envelope, the resistance of said seal member being high compared to said load impedance.

17. A thermionic energy converter operable with a relatively low load impedance and comprising cathode and collector electrodes and a metallic seal member sealed between said electrodes and forming part of a vacuum-tight envelope, the resistance of said seal member being high compared to said load impedance.

18. A thermionic energy converter according to claim 17 and wherein said metallic seal member is corrugated in a bellows-like manner.

19. A thermionic energy converter comprising an envelope containing a thermionic cathode, a collector spaced from said cathode, means for producing positive ions in the space between said cathode and said collector for neutralizing the space charge of electrons emitted by said cathode, said ion producing means including an electrode electrically insulated from said cathode and adapted to operate at a temperature near that of said cathode, and means for heating said cathode and said electrode from a common heat source external to said envelope.

20. A thermionic energy converter comprising an envelope including a thermally conductive portion and containing a thermionic cathode, a collector spaced from said cathode, means for producing positive ions in the space between said cathode and said collector for neutralizing the space charge of electrons emitted by said cathode, said ion producing means including at least one electrode adapted to operate at a temperature near that of said cathode, and means mounting said cathode and said electrode in electrically insulated relation with each other and in thermally conductive relation with each other and with said thermally conductive portion of said envelope, whereby said cathode and said electrode can be heated by a common external heat source.

References Cited in the file of this patent

UNITED STATES PATENTS

| | | |
|---|---|---|
| 1,723,869 | Langmuir | Aug. 6, 1929 |
| 1,728,822 | Charlton | Sept. 17, 1929 |
| 1,740,700 | Nickel | Dec. 24, 1929 |
| 2,158,564 | Meier | May 16, 1939 |
| 2,650,320 | Townsend | Aug. 25, 1953 |
| 2,671,873 | Meier | Mar. 9, 1954 |
| 2,688,648 | McIlvaine | Sept. 7, 1954 |
| 2,845,567 | Geiger | July 29, 1958 |
| 2,882,329 | Liebhafsky | Apr. 14, 1959 |